(12) United States Patent
Nishida et al.

(10) Patent No.: US 6,719,657 B2
(45) Date of Patent: Apr. 13, 2004

(54) LOCK-UP CONTROL APPARATUS FOR AUTOMATIC TRANSMISSION

(75) Inventors: Masaaki Nishida, Anjo (JP); Hiroshi Tsutsui, Anjo (JP); Kouichi Kojima, Anjo (JP); Yutaka Teraoka, Anjo (JP); Masaki Nishide, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 10/279,840

(22) Filed: Oct. 25, 2002

(65) Prior Publication Data

US 2003/0087717 A1 May 8, 2003

(30) Foreign Application Priority Data

Oct. 31, 2001 (JP) ........................................ 2001-335904

(51) Int. Cl.[7] .............................................. F16H 61/14
(52) U.S. Cl. ...................................................... 475/65
(58) Field of Search .............................. 475/65; 477/62, 477/63, 168, 169

(56) References Cited

U.S. PATENT DOCUMENTS

| | | | | |
|---|---|---|---|---|
| 5,038,636 A | * | 8/1991 | Vukovich et al. | ............ 477/148 |
| 5,115,897 A | * | 5/1992 | Yoshimura et al. | ............ 477/65 |
| 5,315,898 A | | 5/1994 | Koyama et al. | |
| 5,573,473 A | * | 11/1996 | Asayama et al. | ............. 477/63 |
| 6,077,188 A | * | 6/2000 | Futamura et al. | ............. 477/65 |
| 6,270,444 B1 | | 8/2001 | Tsutsui et al. | |
| 2002/0037789 A1 | * | 3/2002 | Yeo | .............................. 477/64 |

* cited by examiner

Primary Examiner—Ankur Parekh
(74) Attorney, Agent, or Firm—Oliff & Berridge, PLC (57) ABSTRACT

A lock-up control apparatus for an automatic transmission in which operations of four engagement elements are required when shifting is performed from a first shift speed to a second shift speed, the first shift speed being achieved by engagement of a first engagement element and a second engagement element, the second shift speed being achieved by engagement of a third engagement element and a fourth engagement element. The lock-up control apparatus includes a lock-up control unit that performs a control for bringing a lock-up clutch into one of a disengagement state and a slip state at a start of shifting, and that prevents reengagement of the lock-up clutch at a completion of engagement of the third engagement element when shifting is performed from the first shift speed to the second shift speed during lock up.

24 Claims, 10 Drawing Sheets

|  | C-1 | C-2 | C-3 | B-1 | B-2 | F-1 |
|---|---|---|---|---|---|---|
| P |  |  |  |  |  |  |
| R |  |  | ○ |  | ○ |  |
| N |  |  |  |  |  |  |
| 1st | ○ |  |  |  | △ | ○ |
| 2nd | ○ |  |  | ○ |  |  |
| 3rd | ○ |  | ○ |  |  |  |
| 4th | ○ | ○ |  |  |  |  |
| 5th |  | ○ | ○ |  |  |  |
| 6th |  | ○ |  | ○ |  |  |

LOCK-UP CONTROL APPARATUS FOR AUTOMATIC TRANSMISSION

BACKGROUND OF THE INVENTION

1. Field of Invention

The invention relates to a lock-up control apparatus for an automatic transmission. More particularly, the invention relates to a lock-up control structure for smoothly performing shifting that requires phased switching of engagement and disengagement of the engagement elements between shift speeds.

2. Description of Related Art

An automatic transmission achieves multiple shift speeds by switching a power transfer route via a speed-changing element made up of a planetary gear set by engaging and disengaging the friction engagement elements and changing the gear ratio. It is desirable that the engagement and disengagement of the engagement elements during shifting be performed using the most simple oil pressure control possible while suppressing the occurrence of shifting shock. Therefore, in order to achieve a specific shift speed, generally one other engagement element is additionally engaged while a single or a plurality of engagement elements are in an engagement state, or one of the engagement elements that is engaged is disengaged as basic operations of engagement elements for shifting up and down. In addition, so-called change-over operations, during which an engagement element that is engaged is disengaged while another engagement element is engaged, are performed when necessary due to the gear train structure.

Recently, however, due to demands for improved drivability and for energy conservation by reductions in fuel consumption, there is a trend toward multi-speed automatic transmissions. Generally, these multi-speed automatic transmissions have an additional acceleration or deceleration speed due to an overdrive or underdrive gear in a speed change mechanism made up of a planetary gear set for multiple speeds. As disclosed in Japanese Patent Application Laid-Open No. 4-219553, however, as a different configuration, multiple speeds are achieved using two high and low systems as the input systems for a Ravigneaux type planetary gear set.

Figure 10:
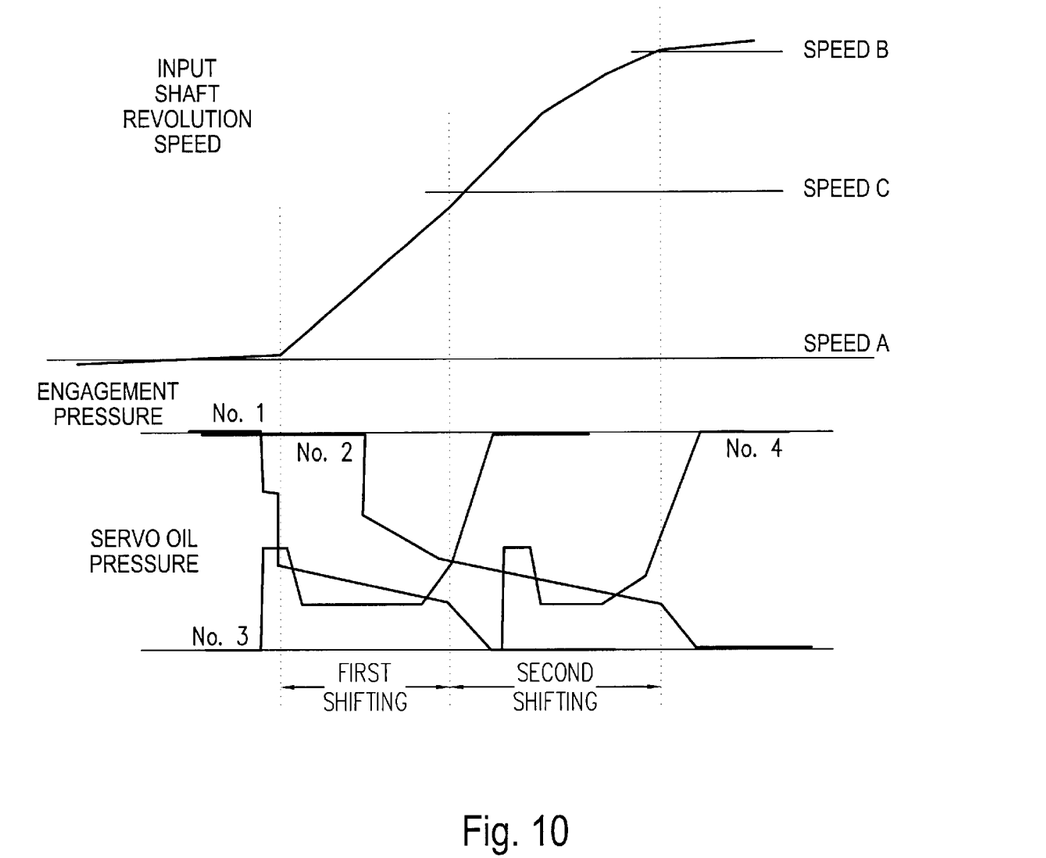
FIG. 10 is a time chart showing the relationship of an oil pressure supply control for each engagement element and the progress of the shifting at the time of conventional multiple change-over shifting.

In a multi-speed automatic transmission such as described above, because the selection range for shift speeds that are suitable for driving states of a vehicle is expanding, not only a simple change-over operation of two engagement elements but also a complex change-over operation of four elements become necessary. An example of a case where this type of four-element change-over is required is a so called jumping shifting that shifts at once to a specific shift speed among multiple shift speeds. In particular, when performing multiple change-over that is represented by this type of four-element change-over, if each engagement element enters an engagement or disengagement state simultaneously, it becomes difficult to determine the behavior of each element of the speed change mechanism, and it becomes impossible to perform control practically. To overcome such problems, as shown in the time chart in FIG. 10, in the case of the shifting that involves the multiple change-over, it becomes necessary to control the servo oil pressure such that the engagement and disengagement of each engagement element (No. 1 through No. 4) occur in a specific order. As a result, shifting is performed in phases. That is, shifting is separated into a first shifting (A–C shifting) of a previous phase in which the disengagement of the first engagement element (No. 1) and the engagement of the third engagement element (No. 3) are switched, and a second shifting (C-B shifting) of a subsequent phase in which the disengagement of the second engagement element (No. 2) and the engagement of the fourth engagement element (No. 4) are switched.

Because the engagement and disengagement of each engagement element occur in a specific order, during the shifting that involves the multiple change-over, phased shock is likely to occur between the first shifting and the second shifting, and the shifting is likely to become slow. The occurrence of phased shock within the shifting and the slowing of shifting give an unpleasant sensation that is undesirable to the driver of the vehicle. To solve these problems, the oil pressure of the second engagement element that needs to be disengaged during the second shifting is lowered during the first shift control, so that the second shifting is started simultaneously with the completion of a change in the input rotation of the first shifting. Thus, the continuous multiple change-over shifting is achieved.

SUMMARY OF THE INVENTION

Another cause of the phased shock occurrence that cannot be solved with only the type of shifting control is the lock-up control of the hydraulic power transmission apparatus that transmits the power to the speed change mechanism.

Figure 11:
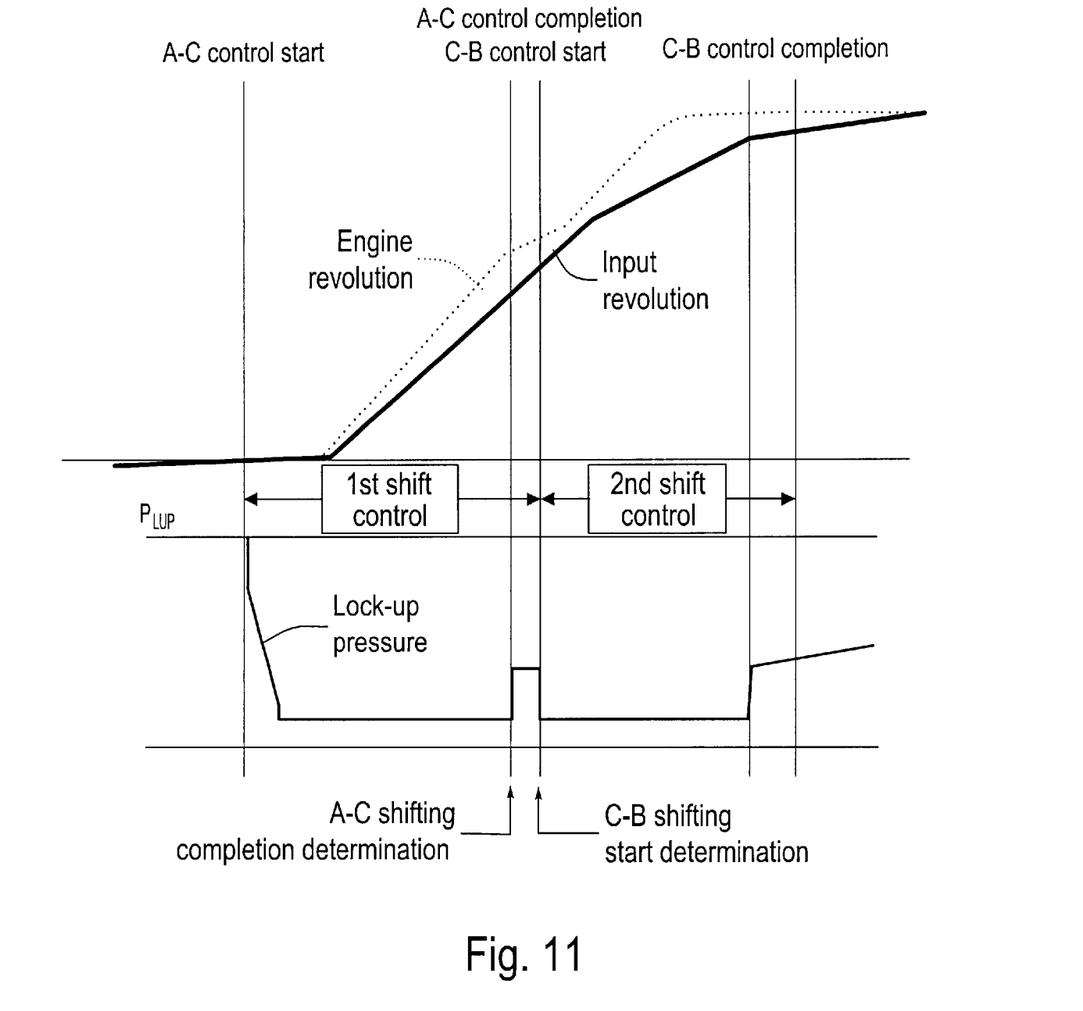
FIG. 11 is a time chart showing the relationship between the progress of the shifting and the lock up when a normal lock-up control is applied to the multiple change-over shifting.

Generally, in the case of a single-plate clutch, a lock-up control lowers a differential pressure applied to the clutch so that the clutch slips during the change in input rotation indicating the shifting from the previous shift speed to the subsequent shift speed. The lock-up control also starts the reengagement of the lock-up clutch by raising the differential pressure in phases simultaneously with the completion of the input rotation change that indicates the synchronization to the subsequent shift speed when the shift control is started in a lock-up on state. In a case where this type of control is performed during the multiple change-over shifting, as shown in the time chart in FIG. 11, when the shifting completion of the previous phase is detected through the input rotation change of the first shifting (A–C shifting), it is determined that the shifting is completed. Next, the control that increases the differential pressure of the lock-up clutch for the start of the reengagement is performed. Then, through the detection of the second shifting (C-B shifting) control start, the control that lowers the differential pressure of the lock-up clutch is performed again. Therefore, as shown by the dotted line in the time chart of FIG. 11, the engine rotation speed is instantaneously decreased due to the lock up during this period, and as a result the shift feel worsens. In order to solve these problems, an object of the invention is to provide a lock-up control apparatus for an automatic transmission that can prevent the occurrence of a phased shock by eliminating the lock-up on operation that occurs instantaneously during the shifting that involves the multiple change-over that starts during lock up.

The above object is achieved through a structure of a lock-up control apparatus for an automatic transmission according to a first aspect of the invention in which four engagement elements are required when shifting is performed from a first shift speed to a second shift speed, the first shift speed being achieved by engagement of a first engagement element and a second engagement element, the second shift speed being achieved by engagement of a third engagement element and a fourth engagement element. In an exemplary embodiment, the apparatus includes a lock-up control unit that performs a control for bringing a lock-up clutch into one of a disengagement state and a slip state at a start of shifting, and that prevents reengagement of the lock-up clutch at a completion of engagement of the third engagement element when shifting is performed from the first shift speed to the second shift speed during lock up.

According to a second aspect of the invention, the above object is achieved through a structure of a lock-up control apparatus for an automatic transmission which inputs power via a lock-up clutch, performs shifting by operations of a first through a fourth engagement elements when shifting is performed from the first shift speed to the second shift speed, and which continuously performs a shift control of a previous phase in which the first engagement element is disengaged and the third engagement element is engaged, and a shift control of a subsequent phase in which the second engagement element is disengaged and the fourth engagement element is engaged when shifting is performed from the first shift speed to the second shift speed. In another exemplary embodiment, the lock-up control apparatus includes a lock-up control unit that performs a control for preventing reengagement of a lock-up clutch at a completion of shifting of the previous phase, the lock-up clutch having been brought into one of a disengagement state and a slip state at a start of shifting when shifting is performed from the first shift speed to the second shift speed during lock up.

BRIEF DESCRIPTION OF THE DRAWINGS

The invention will be described with reference to the drawings, in which.

DETAILED DESCRIPTION OF PREFERRED EMBODIMENTS

In order to solve these problems, an object of the invention is to provide a lock-up control apparatus for an automatic transmission that can prevent the occurrence of a phased shock by eliminating the lock-up on operation that occurs instantaneously during the shifting that involves the multiple change-over that starts during lock up.

The above object is achieved through a structure of a lock-up control apparatus for an automatic transmission according to a first aspect of the invention in which four engagement elements are required when shifting is performed from a first shift speed to a second shift speed, the first shift speed being achieved by engagement of a first engagement element and a second engagement element, the second shift speed being achieved by engagement of a third engagement element and a fourth engagement element. In an exemplary embodiment, the apparatus includes a lock-up control unit that performs a control for bringing a lock-up clutch into one of a disengagement state and a slip state at a start of shifting, and that prevents reengagement of the lock-up clutch at a completion of engagement of the third engagement element when shifting is performed from the first shift speed to the second shift speed during lock up.

Therefore, according to the first aspect of the invention, running load can be prevented from being directly applied to the power source via the lock-up clutch by preventing reengagement during shifting of the lock-up, which has been brought into one of a disengagement state and a slip state, during shifting from the first shift speed to the second shift speed. Therefore, it is possible to prevent the reduction of the change in the input rotation during shifting. Thus, shifting shock can be prevented.

According to an exemplary embodiment of the first aspect of the invention, the automatic transmission is structured such that disengagement of the second engagement element is started after disengagement of the first engagement element is started, and engagement of the fourth engagement element is completed after engagement of the third engagement element is completed.

Therefore, according to this exemplary embodiment, in the shifting where the completion of the engagement of the third engagement element precedes the completion of the engagement of the fourth engagement element, it is possible to prevent the reduction of change in the input rotation due to lock up when the engagement of the third engagement element is completed.

According to another exemplary embodiment of the first aspect of the invention, the automatic transmission can be structured such that the lock-up control unit does not completely engage the lock-up clutch when the engagement of the third engagement element is completed.

Therefore, according to this exemplary embodiment, it is possible to prevent lock up due to completion of engagement of only one of the engagement elements that are engaged in order to achieve the second shift speed engagement. Therefore, it is possible to prevent the reduction of the change in the input rotation during shifting.

According to yet another exemplary embodiment of the first aspect of the invention, the automatic transmission can be structured such that the lock-up control unit maintains the lock-up clutch in one of the disengagement state and the slip state at the completion of engagement of the third engagement element.

Therefore, according to this exemplary embodiment, each of the above results is achieved through the achievement of the disengagement and slip control of the lock-up clutch.

According to a second aspect of the invention, the above object is achieved through a structure of a lock-up control apparatus for an automatic transmission which inputs power via a lock-up clutch, performs shifting by operations of a first through a fourth engagement elements when shifting is performed from the first shift speed to the second shift speed, and which continuously performs a shift control of a previous phase in which the first engagement element is disengaged and the third engagement element is engaged, and a shift control of a subsequent phase in which the second engagement element is disengaged and the fourth engagement element is engaged when shifting is performed from the first shift speed to the second shift speed. In an exemplary embodiment, the lock-up control apparatus includes a lock-up control unit that performs a control for preventing reengagement of a lock-up clutch at a completion of shifting of the previous phase, the lock-up clutch having been brought into one of a disengagement state and a slip state at a start of shifting when shifting is performed from the first shift speed to the second shift speed during lock up.

Therefore, according to the second aspect of the invention, running load can be prevented from being directly applied to the power source via the lock-up clutch by preventing the reengagement of the disengaged lock-up at the completion of shifting of the previous phase during shifting from the first shift speed to the second shift speed. Therefore, it is possible to prevent the reduction of the change in the input rotation during transition from the shifting of the previous phase to the shifting of the subsequent phase, and to continuously perform two-phase shifting. Thus, shifting shock due to a two-phase shifting sensation can be prevented.

In particular, according to an exemplary embodiment of the second aspect of the invention, the lock-up clutch is composed of a single-plate clutch. A control for preventing the reengagement of the lock-up clutch is a control that decreases or makes the differential pressure of the oil pressure applied to the lock-up clutch zero.

Therefore, according this exemplary embodiment, in an automatic transmission in which a single-plate clutch is used as the lock-up clutch, it is possible to perform a control that continuously performs the two-phase shifting by an oil pressure control that uses a conventional oil pressure supply structure.

According to another exemplary embodiment of the second aspect of the invention, the lock-up clutch is composed of a multi-plate clutch. The control for preventing the reengagement of the lock-up clutch is a control that decreases or makes the pressure supplied to the lock-up clutch zero.

Therefore, according to this exemplary embodiment, in an automatic transmission in which a multi-plate clutch is used as the lock-up clutch, it is possible to perform a control that continuously performs the two-phase shifting by an oil pressure control that uses a conventional oil pressure supply structure.

Furthermore, according to yet another exemplary embodiment of the second aspect of the invention, a third shift speed is achieved by the shift control of the previous phase. A control for preventing the reengagement of the lock-up clutch is performed based on a determination on formation of a command for shifting to the second shift speed at a completion of the shifting to the third shift speed.

Therefore, according to this exemplary embodiment, when the shifting of the previous phase achieves the third shift speed, shifting from the first shift speed to the third shift speed that is not multiple change-over shifting, and shifting from the first shift speed to the second shift speed that is multiple change-over shifting are sharply distinguished. Thus, it is possible to perform an appropriate lock-up reengagement control.

According to a further exemplary embodiment of the second aspect of the invention, the third shift speed is a shift speed that achieves the gear ratio between the first shift speed and the second shift speed, and the shifting from the first shift speed to the second shift speed is jumping shifting.

Therefore, according to this exemplary embodiment, it is possible to achieve multiple change-over shifting by shifting that transitions from the first shift speed before shifting via a third shift speed of the intermediate gear ratio to the second shift speed after the final shifting. Thus, it is possible to perform jump shifting from the first shift speed to the second shift speed as a single continuous shifting. Moreover, the lock-up reengagement in the progress of shifting can be eliminated and the reduction in the progress of shifting can be prevented. Thus, the slowing of the shifting can be eliminated, and the occurrence of a two-phase shifting sensation can be prevented.

According to a yet further exemplary embodiment of the second aspect of the invention, the control that inhibits the disengagement of the lock-up clutch is eliminated at a completion of the shifting to the second shift speed.

Therefore, according to this exemplary embodiment, it is possible to securely return to the lock-up state when the multiple change-over shifting that starts from the lock-up state is completed.

Figure 1:
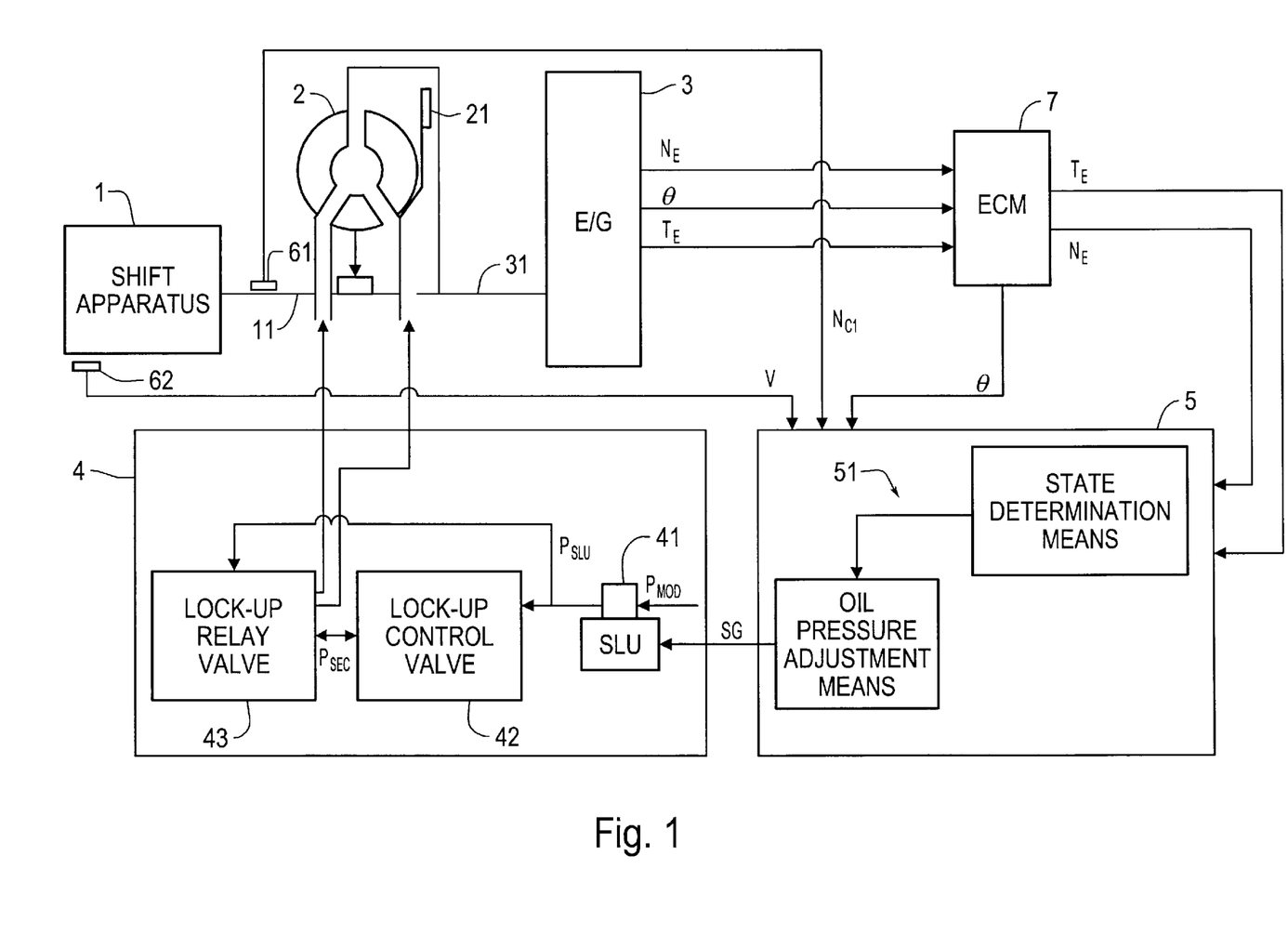
FIG. 1 is a block diagram showing the system structure of a lock-up control apparatus for an automatic transmission according to an embodiment of the invention.

Embodiments of the invention will be described with reference to accompanying drawings. As shown by FIG. 1 in which the system structure is displayed as a block diagram, an automatic transmission includes a shift apparatus 1 and a torque converter 2 to which a lock-up clutch 21 is coupled. The lock-up clutch 21 is coupled to an output shaft 31 of an engine (E/G) 3 as the power source and the shift apparatus 1. A control apparatus that controls the lock-up clutch 21 and the shift apparatus 1 of the automatic transmission comprises an oil pressure control device 4 and an electronic control unit (ECU) 5 that controls the oil pressure control device 4 by a solenoid.

A lock-up control unit in the embodiments of the invention is built-in as a calculation processing function that follows a built-in program in the electronic control unit (ECU) 5. In addition, various sensors are provided as the input unit for control through the lock-up control unit. Exemplary sensors associated with the automatic transmission include a transmission input shaft rotation speed sensor 61 that detects the input rotational speed of a shift apparatus 1, and a vehicle speed sensor 62 that detects vehicle speed from an output shaft rotation of the shift apparatus 1. In this structure, vehicle engine rotation speed ($N_E$) information, throttle opening ($\theta$) information as the engine load, and engine torque ($T_E$) information are obtained by communication with an engine control module (ECM) 7 for controlling the engine.

The lock-up control unit 51 in the electronic control unit 5, as described later in detail in reference to a flowchart, includes of a shifting state determination unit that is a unit used for distinguishing between the multiple change-over shifting and other shifting, and an oil pressure regulating unit used as the calculation unit for the oil pressure output. Oil pressure output information of the calculation results is applied as a solenoid drive signal SG to a solenoid of a lock-up solenoid valve 41 of an oil control device 4 described later in detail in reference to an oil pressure circuit diagram.

Figure 2:
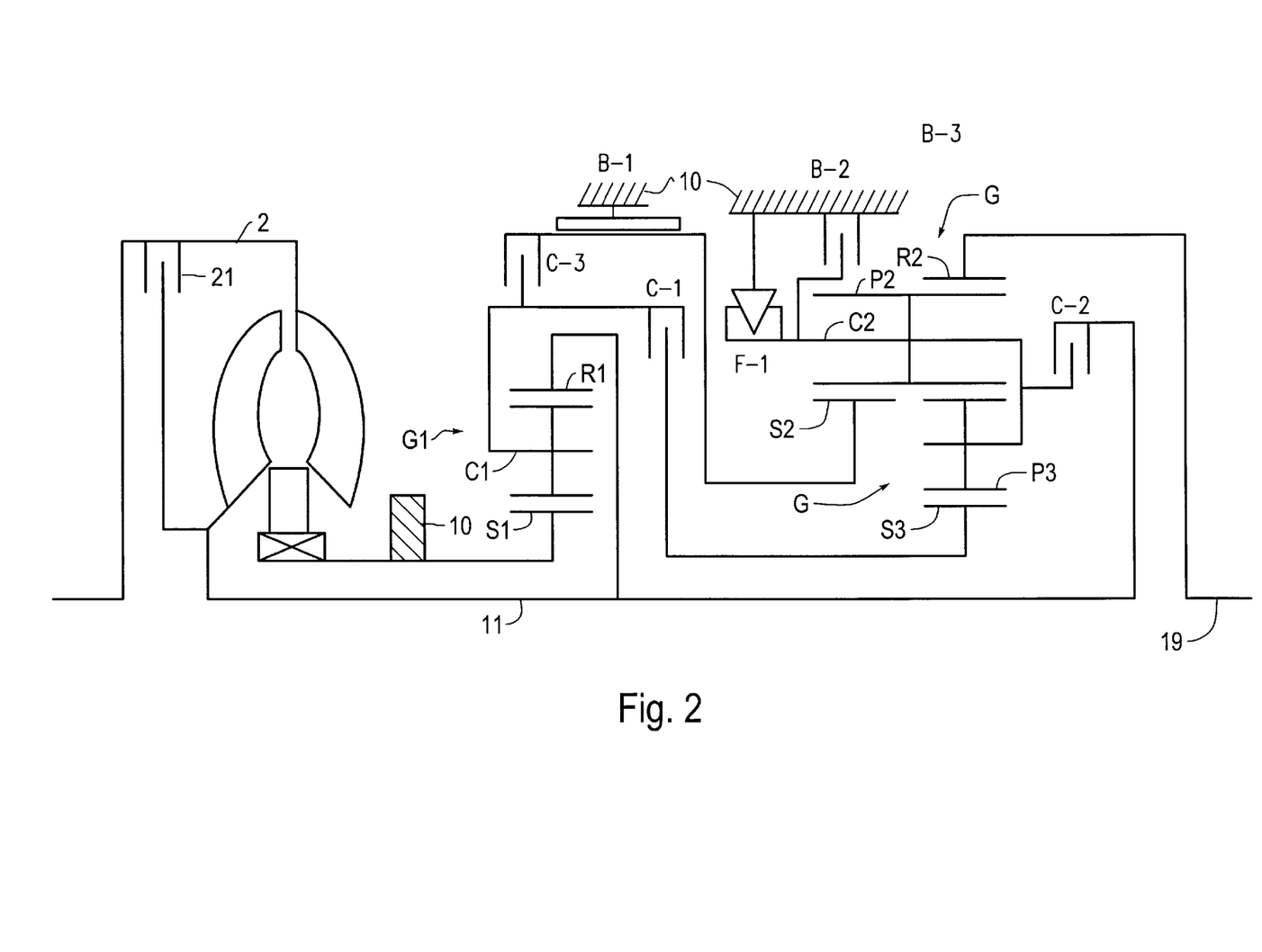
FIG. 2 is a schematic diagram of the gear train for an automatic transmission.

FIG. 2 shows the schematic diagram of a gear train structure of a 6-speed automatic transmission for use in a front engine rear wheel drive (FR) vehicle as an example of an automatic transmission that achieves the multiple change-over control of four elements through the above mentioned control apparatus. The automatic transmission shown in FIG. 2 is composed of a six forward speeds and one reverse speed shift apparatus 1 formed by combining a torque converter 2 with a lock-up clutch 21, a Ravigneaux type planetary gear set G, and a simple planetary type reduction gear G1.

The planetary gear set G that forms the main body of the shift apparatus 1 is composed of a Ravigneaux type gear set, such as the system described in U.S. Pat. No. 5,106,352, to Lepelletier et al., which is incorporated herein by reference in its entirety, that includes two sun gears S2 and S3 of different diameters, one ring gear R2, a long pinion gear P2 that externally engages the large diameter sun gear S2 and internally engages the ring gear R2, a short pinion gear P3 that externally engages the small diameter sun gear S3 and also externally engages the long pinion gear P2, and a carrier C2 that supports both pinion gears P2 and P3. The small diameter sun gear S3 of the planetary gear set is coupled to a multi-plate structured clutch (C-1). Hereinafter, the abbreviation for each engagement element will be shown before each engagement element. The large diameter sun gear S2 is coupled to a multi-plate structured C-3 clutch, and can be held to an automatic transmission case 10 by a B-1 brake that is composed of a handbrake. Also, the carrier C2 is coupled to an input shaft 11 via a C-2 clutch as the multi-plate structured engagement element, and can be held to the transmission case by a multi-plate structured B-2 brake. In addition, the carrier C2 can be held to the transmission case such that it can rotate in one direction by an F-1 one-way clutch. A ring gear R2 is coupled to an output shaft 19.

The reduction planetary gear G1 includes a simple planetary gear and a ring gear R1 as the input element is coupled to the input shaft 11. A carrier C1 as the output element is coupled to a small diameter sun gear S3 via the C-1 clutch, and is coupled to the large diameter sun gear S2 via the C-3 clutch. A sun gear S1, which serves as the fixed element that takes the reaction force, is attached to the transmission case 10.

Figure 3:
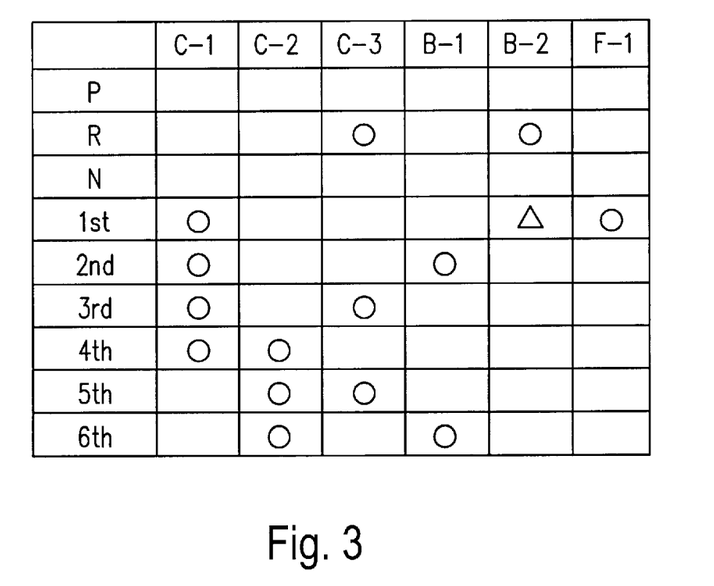
FIG. 3 is an engagement chart showing each shift speed achieved by the gear train and the engagement and disengagement relationship of each engagement element.

FIG. 3 shows an engagement chart illustrating the relationship between engagement/disengagement of each engagement element in the case of the automatic transmission, that is, the clutch, brake and one-way clutch, and the achieved shift speed. In the engagement chart of FIG. 3, the circle symbol ("○") indicates engagement, no symbol indicates disengagement and the triangle symbol ("Δ") indicates engagement for achieving engine brake.

Figure 4:
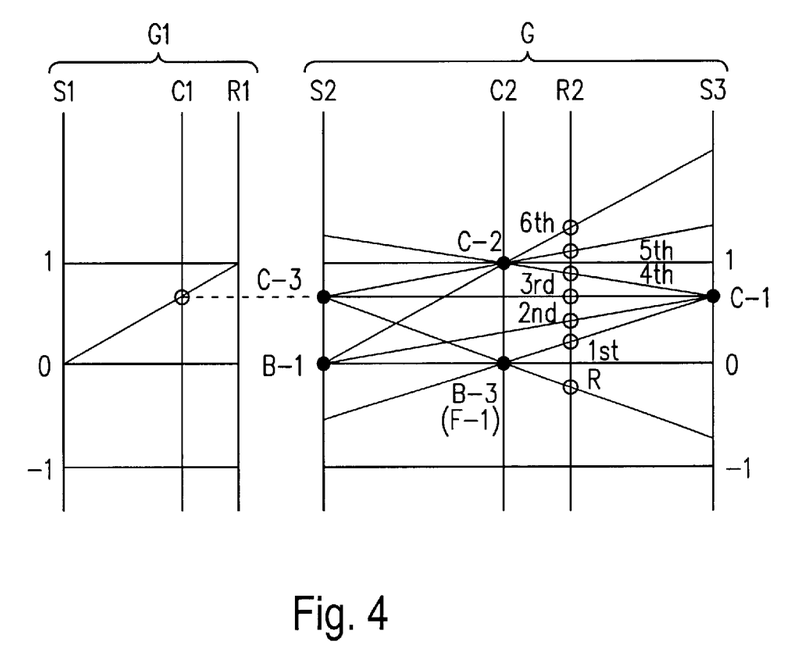
FIG. 4 is a speed diagram showing the operation of each speed-changing element of the gear train by the engagement and disengagement of each engagement element.

FIG. 4 shows a speed diagram illustrating the relationship between the shift speed that is achieved by the engagement of the clutch, brake and one-way clutch, the black circle symbol indicates these engagements, and the rotation speed ratio of each speed-changing element at that time. The speed diagram of FIG. 4 shows the speed ratio of each speed-changing element on the vertical axes and shows the gear ratios between the related speed-changing elements between the vertical axes in the horizontal direction.

As is apparent by referring to FIGS. 3 and 4, a first speed (1st) is achieved through engagement of the C-1 clutch and B-2 brake. It should be appreciated by those skilled in the art that in this embodiment, as can be understood by referring to the operation chart, in place of the engagement of the B-2 brake, the automatic engagement of the F-1 one-way clutch is used. As for the reason why this engagement is used, or the reason why this engagement is equivalent to the engagement of the B-2 brake, the complex oil pressure control due to the change-over of the B-2 brake and the B-1 brake when shifting from 1 to 2 as described later is eliminated. In addition, in order to simplify the disengagement control of the B-2 brake, the F-1 one-way clutch that automatically releases the engagement force in accordance with the engagement of the B-1 brake is used. Therefore, the automatic engagement of the F-1 one-way clutch is equivalent to the engagement of the B-2 brake.

In this structure system, rotation, which has been decelerated through the reduction planetary gear G1 from the input shaft 11, is input to the small diameter sun gear S3 via the C-1 clutch, reaction force is taken by the carrier C2 that is held by the engagement of the F-1 one-way clutch, and the decelerated rotation of the maximum deceleration ratio of the ring gear R2 is output to the output shaft 19.

A second speed (2nd) is achieved by the engagement of the C-1 clutch and B-1 brake. In this case, rotation from the input shaft 11 which has been decelerated through the reduction planetary gear G1, is input to the small diameter sun gear S3 via the C-1 clutch, a reaction force is taken by the large diameter sun gear S2 that is held by the engagement of the B-1 brake, and the decelerated rotation of the ring gear R2 is output to the output shaft 19. The deceleration ratio at this time, as seen in FIG. 4, is smaller than that of the first speed (1st).

A third speed (3rd) is achieved by the simultaneous engagement of the C-1 clutch and C-3 clutch. In this case, the rotation from the input shaft 11 that is decelerated through the reduction planetary gear G1 is simultaneously input to the large diameter sun gear S2 and the small diameter sun gear S3 via C-1 clutch and C-3 clutch. Because the planetary gear is in a direct coupling state, the rotation of the ring gear R2 that is the same as the rotation input to both the sun gears is output to the output shaft 19 as the rotation that is decelerated with respect to the rotation of the input shaft 11.

A fourth speed (4th) is achieved by the simultaneous engagement of the C-1 clutch and C-2 clutch. In this case, while rotation from the input shaft 11 that is decelerated through the reduction planetary gear G1 is input to the small diameter sun gear S3 via the C-1 clutch, the non-decelerated rotation that is input from the input shaft 11 via the C-2 clutch is input to the carrier C2. Intermediate rotation of the two input rotations is output to the output shaft 19 as the rotation of the ring gear R2, which has been slightly decelerated with respect to the rotation of the input shaft 11.

A fifth speed (5th) is achieved by the simultaneous engagement of the C-2 clutch and C-3 clutch. In this case, rotation from the input shaft 11 that is decelerated through the reduction planetary gear G1 is input to the large diameter sun gear S2 via the C-3 clutch while the non-decelerated rotation that is input from input shaft 11 via the C-2 clutch is input to the carrier C2. The rotation of the ring gear R2 which has been slightly accelerated with respect to the rotation of the input shaft 11, is output to the output shaft 19.

A sixth speed (6th) is achieved by the engagement of the C-3 clutch and the B-2 brake. In this case, the non-decelerated rotation is input only to the carrier C2 from the input shaft 11 via the C-2 clutch, reaction force is taken by the sun gear S2 that is held by the engagement of the B-1 brake, and the rotation of the ring gear R2 that is further accelerated is output to the output shaft 19.

A reverse speed (R) is achieved by the engagement of the C-3 clutch and B-2 clutch. In this case, the rotation from the input shaft 11, which has been decelerated through the reduction planetary gear G1, is input to the large diameter sun gear S2 via the C-3 clutch, reaction force is taken by the carrier C2 that is held by the engagement of the B-2 brake, and the reverse rotation of the ring gear R2 is output to the output shaft 19.

As is qualitatively apparent by referring to vertical distances between the circle ("o") symbols that indicate the speed ratios of the ring gear R2 on the speed diagram in FIG. 4, each shift speed established as described above forms a good speed step of a comparatively equal interval with respect to each shift speed. In this gear train, multiple change-over of the engagement elements is not necessary during normal up and down shifting between neighboring shift speeds; it is only necessary for jumping shifting. Jumping shifting using the multiple change-over is often required particularly during downshifting. Referring to the engagement chart in FIG. 3, jumping shifting from 6 to 3 and jumping shifting from 5 to 2 are such cases.

Figure 5:
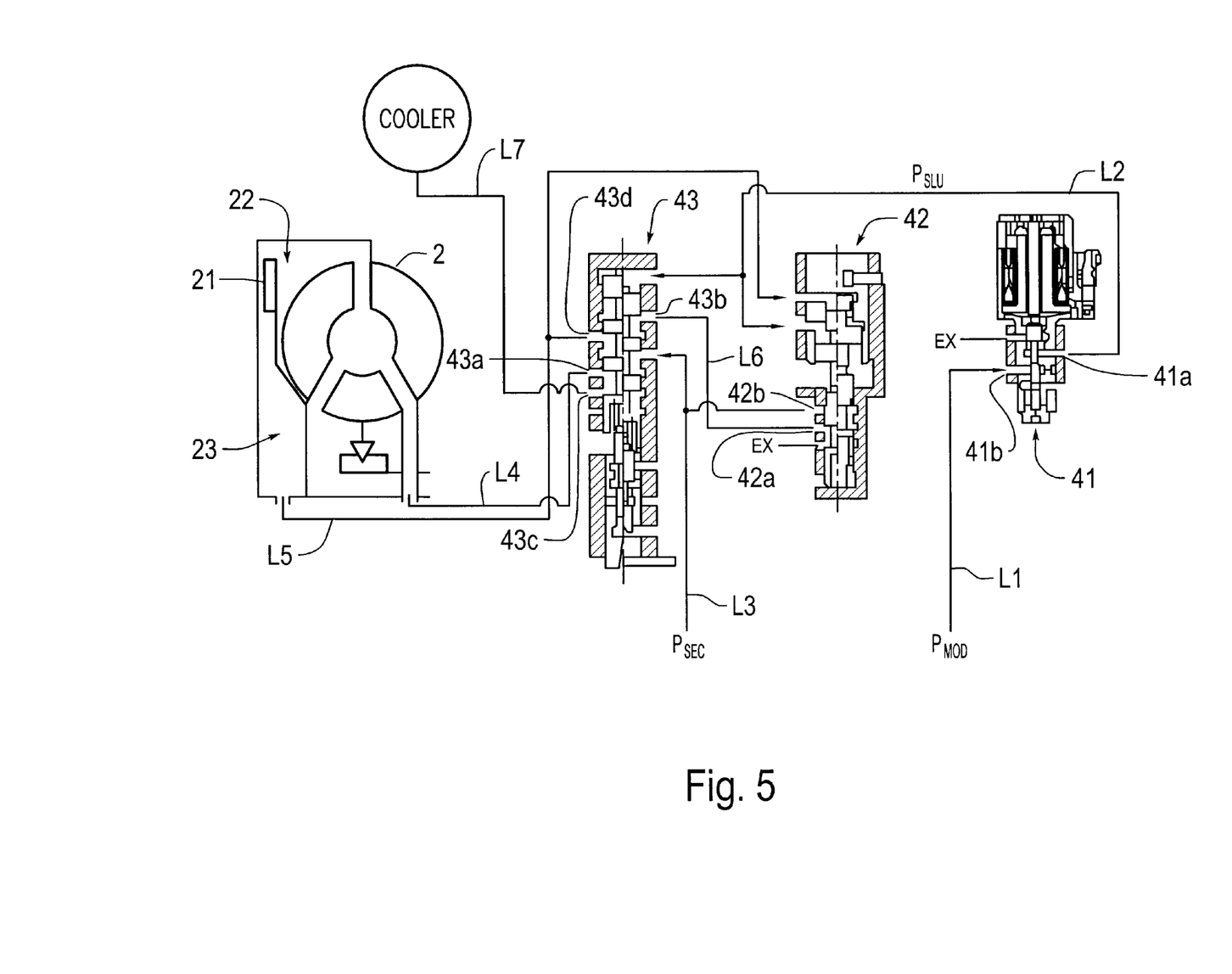
FIG. 5 is an oil pressure circuit diagram of the lock-up control circuit portion of the oil pressure control device of an automatic transmission.

The oil pressure control device 4 controls the shift apparatus 1 that is structured in such a manner through the operation of the oil pressure servo of each clutch and brake. As shown in FIG. 5 the specific circuit structure includes, a lock-up control circuit, provided in the oil pressure control device 4 so that the above-mentioned jumping shifting can be performed easily, and a shift control circuit that individually controls the oil pressure servo of each engagement element with the solenoid drive signal from an electronic control unit 5.

In an exemplary embodiment, the lock-up control circuit is composed of a lock-up linear solenoid valve 41, a lock-up control valve 42 that operates to regulate pressure with the application of a solenoid pressure ($P_{SLU}$) as the output signal pressure, and a lock-up relay valve that switches the supply and discharge of a secondary pressure ($P_{SEC}$) to and from a torque converter 2 with the application of the solenoid pressure ($P_{SLU}$) in the same way. The secondary pressure ($P_{SEC}$) is an oil pressure that is produced by reducing the line pressure so as to be supplied to the torque converter 2. The lock-up linear solenoid valve 41 is a three-port spool valve that controls the communication path of an output port 41a with respect to a modulator pressure ($P_{MOD}$) input port 41b and a drain port EX, through the application of a solenoid load signal (SG) that resists spring load. The modulator pressure input port 41b of the lock-up linear solenoid valve 41 is coupled to a modulator pressure oil passage $L_1$ as the output oil passage of a solenoid modular valve, which regulates and outputs the pressure of the modulator pressure, using the line pressure as the base, (not illustrated). Also, the output port 41a is coupled to a plunger radius difference pressure-receiving portion of the lock-up control valve 42, and a spool end pressure-receiving portion of a lock-up relay valve 43 via a solenoid pressure oil passage $L_2$.

The lock-up control valve 42 includes a pressure-receiving plunger that resists the spring load of the three port spool valve. The pressure-receiving plunger has a radius difference, and the radius difference portion is a pressure-receiving portion of the solenoid pressure ($P_{SLU}$). The plunger end portion is a pressure-receiving portion of the oil pressure of a lock-up off room 23 side of the torque converter 2. The spool of this valve 42 includes a regulating valve that controls the communication degree of an output port 42a with respect to a secondary pressure input port 42b and a drain port EX. The output port 42a is coupled to a return oil passage of the lock-up relay valve 43. Therefore, the input port 42b of the valve 42 is coupled to the lock-up relay valve 43 via a secondary pressure oil passage $L_3$, and the output port 42a is coupled to the lock-up relay valve 43 via an oil passage $L_6$.

The lock-up relay valve 43 is a six port spool valve that includes a pressure-receiving plunger that pressurizes the spool via a spring. The valve 43 includes a switch valve that switches communications of an output port 43a with a secondary pressure input port 43b and a cooler return port 43c, and switches communications of an output port 43d with the secondary pressure input port 43b and an output port 42a of the lock-up control valve 42. The output port 43a is coupled to a lock-up on room 22 side of the torque converter 2, and the output port 43d is coupled to a lock-up off room 23 side.

In the lock-up control circuit having the above-mentioned structure, when the solenoid pressure that is output by the lock-up linear solenoid valve 41 is low, the lock-up relay valve 43 moves to the spool position in the left half of the diagram and the secondary pressure ($P_{SEC}$) is supplied to the lock-up off room 23 side via the valve 43. Thus, the lock-up clutch 21 is disengaged by eliminating the differential pressure that is applied to the lock-up clutch 21. The pressure flows to the hydraulic transmission room of the lock-up on room 22 side, and flows to the cooler via the lock-up relay valve 43. When the solenoid pressure ($P_{SLU}$) that is output by the lock-up linear solenoid valve 41 is high, the lock-up relay valve 43 moves to the spool position in the right half of the diagram, allowing the lock-up off room 23 side to communicate with the output port 42a of the lock-up control valve 42 via the lock-up control relay valve 43, and to also communicate with the drain EX. The secondary pressure ($P_{SEC}$) is supplied to the lock-up on room 22 side via the lock-up relay valve 43. Thus, a differential pressure that applies to the lock-up clutch 21 is generated, and the lock-up clutch 21 is engaged. In this manner, lock-up on and off is controlled by the solenoid pressure ($P_{SLU}$) that is output by the lock-up linear solenoid valve 41.

Figure 6:
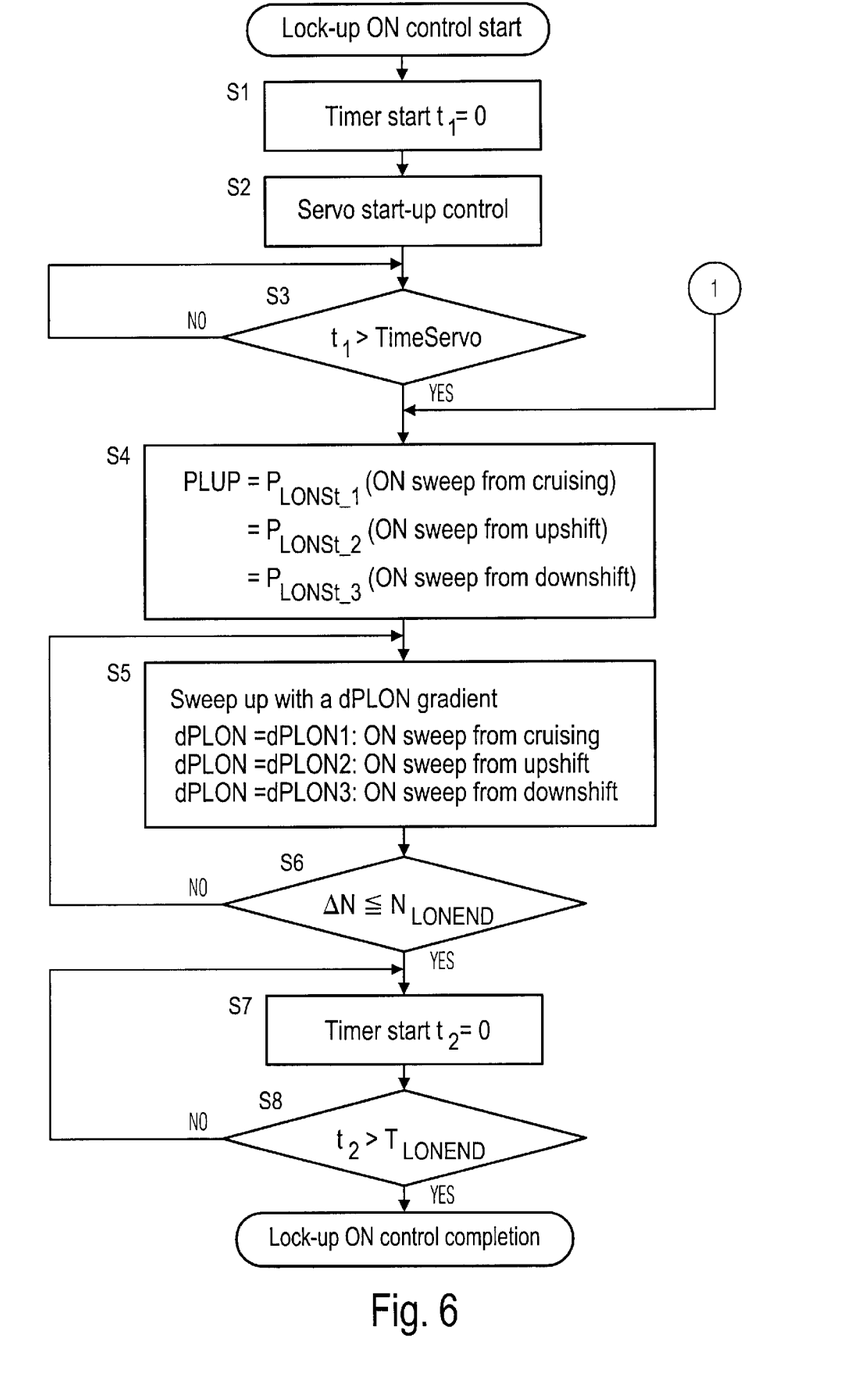
FIG. 6 is a flowchart showing the flow of the lock-up on control.

The normal lock-up on control that is achieved by the calculation processing of the electronic control unit 5 will next be explained with reference to the control flow in FIG. 6. This flow starts from the timer start ($t_1=0$) of step S1. This step is for determining the timing until the end of the next servo start-up control using a timer. After that, the servo start-up control is performed in step S2. Then, the timer determination ($t_1$>Time Servo) is performed in step S3. Thus, when the servo start-up preparations have been confirmed, in step S4 the calculation of the lock-up pressure (PLUP) at the start of sweep up for the purpose of lock-up on is performed. In this case, the lock-up pressure for the purpose of on sweep from cruising ($P_{LONSt\_1}$), the lock-up pressure for the purpose of the on sweep from the upshift ($P_{LONSt\_2}$) and the lock-up pressure for the on sweep from the downshift ($P_{LONSt\_3}$) are set. In the next step S5, the sweep up signal is output according to the specific oil pressure increase gradient (dPLON) that is calculated based on the previously set lock-up pressure (PLUP). In this case as well, the gradient for the purpose of on sweep from cruising (dPLON1), the gradient for the purpose of on sweep from upshift (dPLON2) and the gradient for the purpose of on sweep from down shift (dPLON3) are each set. In this way, while carrying out the sweep up, the amount of slip of the lock-up clutch (the difference between the engine rotation speed and input rotation speed) (ΔN) is monitored in step 6. This determination is formed when the value is compared with a preset rotation difference determination value and is less than the preset value. If the lock-up on is confirmed in this way, the timer measurement for the completion processing in the next step S7 starts ($t_2=0$). Then, when the timer determination ($t_2 > T_{LONEND}$) in the next step S8 is formed, the lock-up on control finishes.

Figure 7:
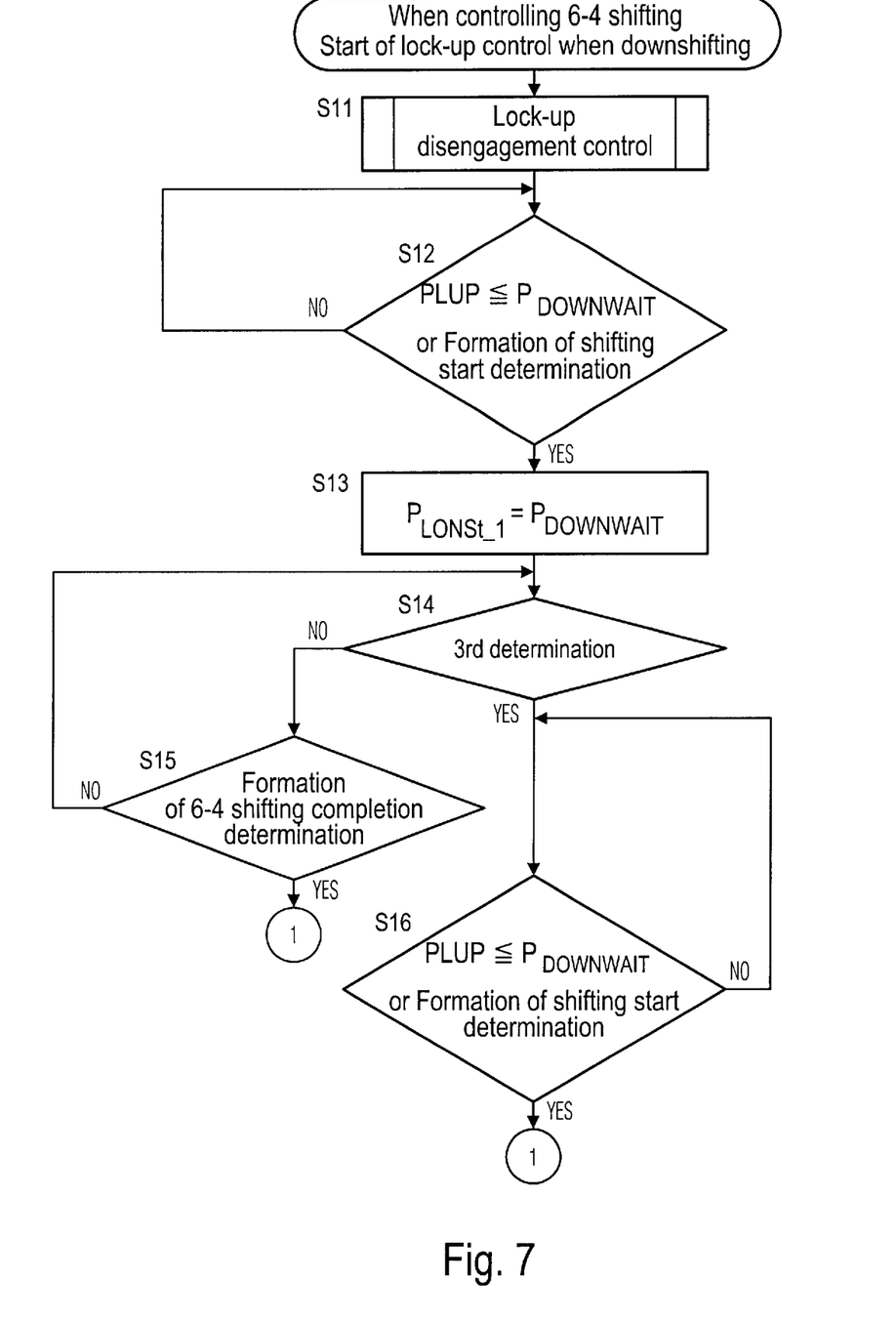
FIG. 7 is a flowchart showing the broken up flow of the lock-up control when shifting from 6 to 3.

In contrast with this type of normal lock-up control, a control for preventing the reengagement in the embodiments of the lock-up clutch by the lock-up control unit of this invention is executed such that an interrupt occurs. Next, as an example, the case in which the control flow is shifted from 6 to 3 through the lock-up control unit 21 is discussed in detail.

This control begins with the initial lock-up disengagement control of the shifting as the first step S11. After this disengagement control, in step S12, it is determined whether the lock-up pressure is equal to or lower than the stand-by pressure at the time of downshifting (the oil pressure $P_{DOWNWAIT}$ for making the lock-up clutch stand-by in an off state or in a slip state during shifting), or whether the shifting start determination is formed. When this determination is formed, in the next step S13, the lock-up pressure (PLUP) at the time of downshifting is set to the stand-by pressure ($P_{DOWNWAIT}$). In step S14, it is determined whether the command for shifting to the third speed (3rd) is formed. At this point, when the third speed (3rd) determination is not made, the process goes to 6–4 shifting completion determination in step S15. When this 6–4 shifting completion determination is formed, the process goes to step S4 of the previous flow so that the lock-up reengagement is performed at the completion of the shifting to the fourth speed. Also, when the 6–4 shifting completion determination in step S15 is not made, the process returns to the third speed (3rd) determination of step S14, and waits for the third speed (3rd) determination to be made. When the third speed (3rd) determination is formed in step S14, the process goes to the 4–3 shifting completion determination of step S16. In this manner, if the 4–3 shifting completion determination is formed, the process goes to step S4 of the previous flow so that the lock-up reengagement is performed at the completion of the shifting to the third speed.

Assuming that the control for starting the disengagement control of the second engagement element during the engagement control of the third engagement element is performed at the time of multiple change-over shifting as initially described, the third speed (3rd) determination of step S14 and the 6–4 shifting completion determination of step S15 can be integrated as the 6–4 shifting completion determination during multiple change-over shifting by using the information on the disengagement control of the second engagement element as an index for determination on the command for shifting to the third (3rd) speed.

Figure 8:
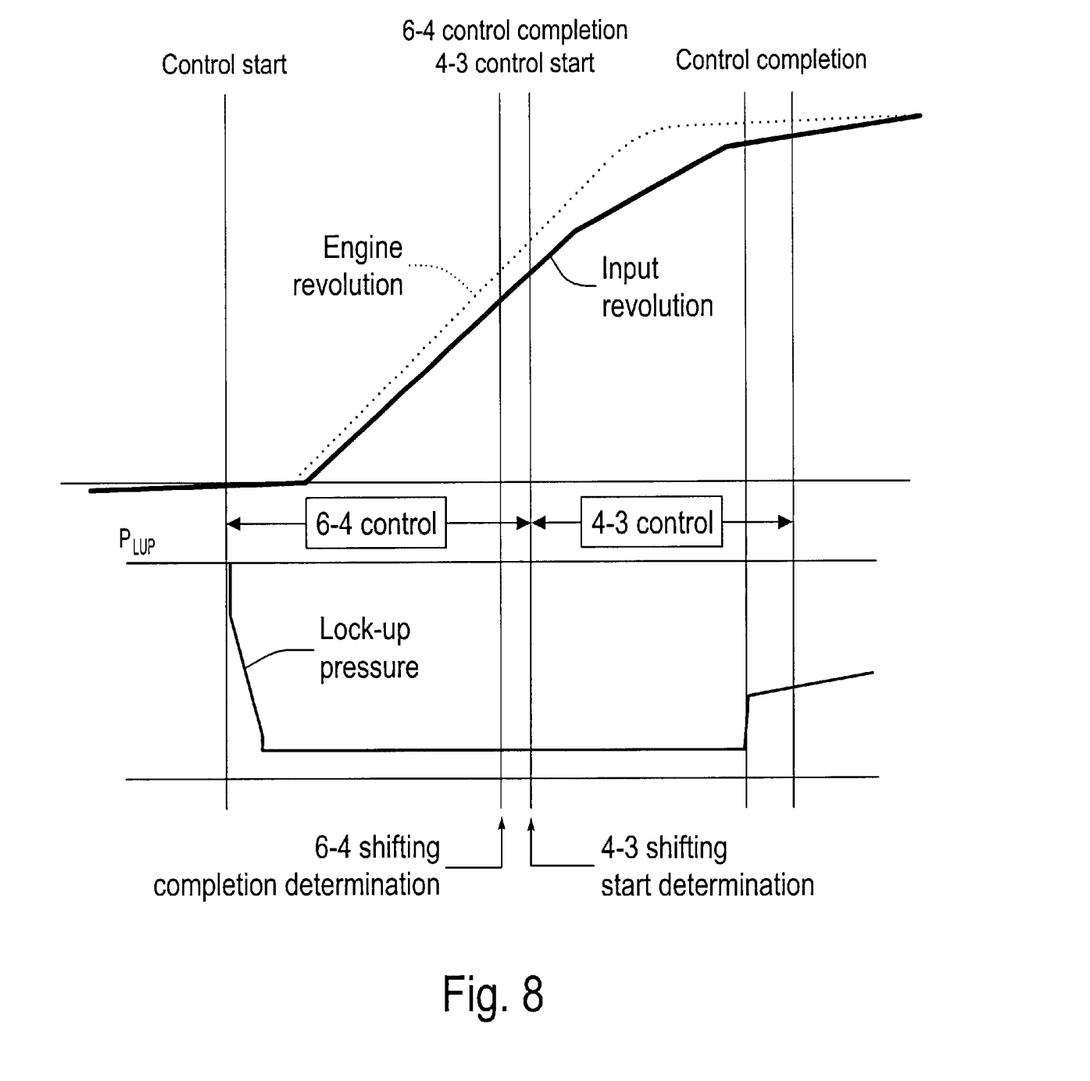
FIG. 8 is a time chart showing the relationship of the progress of the shifting and the lock up when shifting from 6 to 3.

FIG. 8 shows a time chart illustrating the lock-up operation when shifting from 6 to 3 in conjunction with the input shaft rotation speed and the engine rotation speed. As shown in the chart, the decrease in lock-up pressure ($P_{LUP}$) takes place simultaneously with the start of 6–4 shifting. In this case, in particular, through the processing to lower the solenoid drive signal that is output by the electronic control unit 5 in a step-by-step manner, the solenoid pressure ($P_{SLU}$) that is output by the lock-up linear solenoid valve 41 of the oil pressure control device 4 becomes the stand-by pressure at the time of downshift. Thus, the lock-up relay valve 43 is maintained in an oil passage communication state of the lock-up on, the spool position in the right half of FIG. 5, and the secondary pressure ($P_{SEC}$) supply to the lock-up on room 22 side is continued. Meanwhile, the oil pressure adjusted by the pressure regulating operation of the lock-up control 42 is applied on the lock-up off room 23 side via the lock-up relay valve 43 and the lock-up control valve 42. By making this pressure the same as the secondary pressure, the lock-up clutch 21 is formed into a disengagement state or a slip state.

In this lock-up disengagement state, shifting starts, and the input shaft rotation speed increases toward the rotation speed of the fourth speed synchronization the rotation speed is determined from the output shaft rotation speed that is determined from the vehicle speed, and the fourth speed gear ratio along with the increase in the engine rotation speed. The solid line in the chart shows the input shaft rotation speed and the dotted line shows the engine rotation speed. In this way, when the input rotation speed increases to the rotation speed just before the specified level of the fourth speed synchronization rotaiton speed, the 6–4 shifting completion judgement is formed for the control that monitors the change in rotation.

The processing that prevents the lock-up reengagement is executed according to the control in the embodiment of the invention. in this embodiment, the specific processing is the processing that maintains the solenoid drive signal at the standby pressure. Thus, the solenoid pressure ($P_{SLU}$) that is output by the lock-up linear solenoid valve 41 is maintained at a standby pressure in the decreased state, where the lock-up relay valve 43 is maintained in the oil passage communication state of lock-up on, i.e.,the spool position on the right half of FIG. 5, and the secondary pressure ($P_{SEC}$) supply to the lock-up linear solenoid valve is continued. Meanwhile, the lock-up off chamber 23 side is connected to the drain oil passage via the lock-up relay valve 43 and the lock-up control valve 42. In this case, the drain amount is adjusted by the pressure regulating operation of the lock-up control valve 42. In the lock-up control valve 42, the solenoid pressure ($P_{SLU}$) that is applied from the lock-up linear solenoid valve 41 is applied to the radius difference pressure-receiving portion of the pressure-receiving plunger, and following this signal pressure, the oil pressure of the lock-up off room 23 side is applied to the end portion pressure-receiving portion of the pressure receiving plunger. In this way, the drain amount is adjusted and the oil pressure of the lock-up off room 23 side is formed the same as the secondary pressure. Thus, the engine rotation speed increases without reducing the rotation increase, while direct vehicle running load due to the lock-up clutch engagement is not transmitted, and the load fluctuations is absorbed by the slip due to the hydraulic transmission of the torque converter 2. In this way, when the rotation speed of the fourth speed synchronization is achieved, the 4–3 shifting start determination is formed, and the shifting is continuously transitioned to the 4–3 shifting.

In the 4–3 shift control, because processing is conducted that prevents the occurrence of inertia torque due to the rapid rotation change when the shifting is completed, the input shaft rotation speed increases toward the third speed synchronization rotation while the gradient is gradually reduced. When the input shaft rotation speed becomes substantially the third speed synchronization rotation speed, the lock-up engagement is achieved through the normal lock-up reengagement processing. In this case, the specific processing includes processing that sweeps up the solenoid drive signal in accordance with the previous step S5. Thus, the solenoid pressure ($P_{SLU}$) that is output by the lock-up linear solenoid valve 41 increases to a predetermined value, causing the reengagement of the lock-up clutchto be achieved smoothly. In this way, the lock-up disengagement control during the 6 to 3 downshift period is performed, and the reversion to the lock-up state after the 6 to 3 downshift from the lock-up state is achieved without the reduction of the shifting and the occurrence of a two-phase shifting sensation due to the decrease in the engine rotation during the process.

In this way, according to the lock-up control apparatus of this embodiment, by preventing reengagement of the lock-up that has been released at the completion of the 6–4 shifting of the previous phase during the shifting from the sixth speed to the third speed, running load is prevented from being directly applied to the engine 3 via the lock-up clutch 21. Therefore, the reduction of the input rotation change is prevented at the time of transition from the 6–4 shifting of the previous phase to the 4–3 shifting of the subsequent phase, and the two-phase shifting can be continuously executed. Thus, shifting shock caused by the two-phase shifting sensation can be prevented.

Moreover, due to the third speed judgement in step S14, the shifting from the sixth speed to the fourth speed, and the shifting from the sixth speed to the third speed are sharply distinguished, and it is possible to conduct the appropriate lock-up reengagement control. Also, the lock-up pressure ($P_{LUP}$) during the 6 to 3 downshift period is decreased to a specific pressure. However, the lock-up pressure ($P_{LUP}$) may be changed according to the input torque, or may be controlled so that the speed of change of the input shaft rotation speed becomes small at the completion of the 4–3 shifting of the subsequent phase. The lock-up pressure ($P_{LUP}$) may be compensated according to the input rotation change at the completion of the 6–4 shifting of the previous phase so that reduction of the rotation changes can be prevented.

While, the discussion above presented the 6 to 3 shifting process, even in the case of 5 to 2 shifting, the same embodiment of shift control can be employed by simply changing the engagement elements to be controlled. The first engagement element in this case is the C-2 clutch, the second engagement element is the C-3 clutch, the third engagement element is the C-1 clutch, and the fourth engagement element is the B-1 brake.

Figure 9:
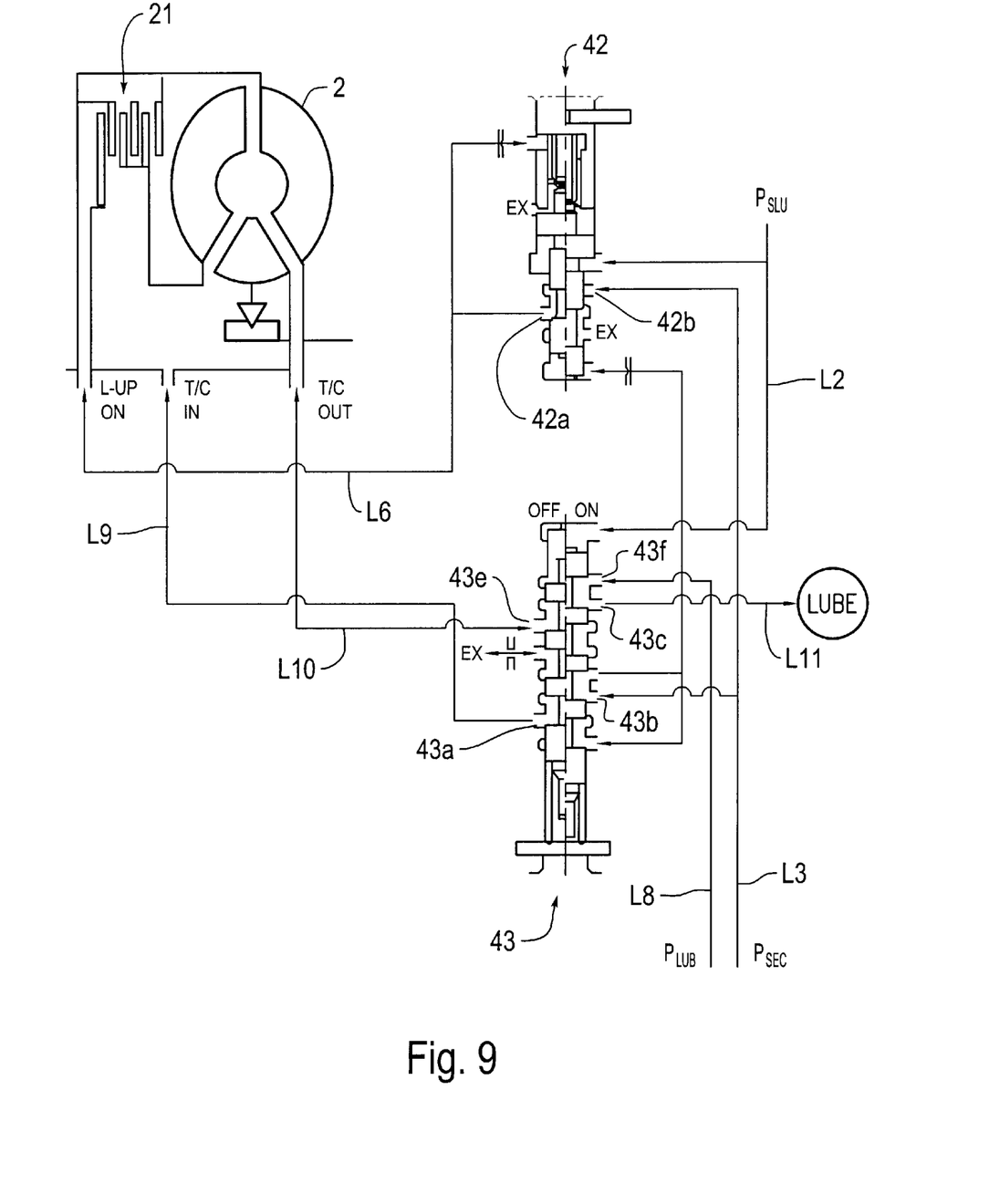
FIG. 9 is an oil pressure circuit diagram of the modification example of the lock-up control circuit portion of the oil pressure control device of an automatic transmission.

Also, regarding the form of the lock-up clutch 21 to be controlled, in addition to a differential pressure operated single-plate clutch as shown in the previous example, a lock-up clutch with a multi-plate structure that has a lock-up oil room independent of the hydraulic transmission room may be employed. FIG. 9 shows the structure of the lock-up clutch control circuit of this type. In this case, the oil pressure is supplied to and discharged from the operation oil room of the lock-up clutch 21 exclusively by the lock-up control valve 42 via the oil passage $L_6$ by regulating the communication degree of the input port 42b, output port 42a and drain port EX. The lock-up control valve 42 operates to regulate the pressure in accordance with the solenoid pressure ($P_{SLU}$) and the feedback pressure of the operation oil room side using the secondary pressure ($P_{SEC}$) as the basic pressure. Also, the oil pressure is supplied to the hydraulic transmission room side of the torque converter 2 in a lock-up on state where the solenoid pressure ($P_{SLU}$) is high by switching the lock-up relay valve 43 to the spool position shown in the right half of the figure so that the secondary pressure oil passage $L_3$ communicates with an oil passage $L_9$ via the port 43b and port 43a, and an oil passage $L_{10}$ communicates with the drain via the port 43e. In this way, in the case of a clutch structure that has a lock-up oil room/chamber independent of a hydraulic transmission room, the on-off control and slip control of a lock-up clutch is executed through the supply and discharge of the oil pressure by the lock-up control valve 42. In FIG. 9, $P_{LUB}$ denotes lubricant oil pressure, $L_8$ denotes a lubricant oil passage, and 43f denotes the input port of the lubricant oil pressure.

The invention has been explained using a representative exemplary embodiment in the specific gear train. However, this invention is not limited to the gear train shown in the example, but is applicable to all gear trains in which the engagement and disengagement relationship of the engagement elements in the shifting that is related to four engagement elements is two-element simultaneous change-over. Also, the lock-up control according to the invention can be applied not only to the shifting that originally requires the multiple change-over, but also to the shifting state that requires the multiple change-over as a result of the change of the target shift speed due to the change of the throttle opening during the progress of the specified shifting. In the case of the gear train shown in the example, the shifting states to which the lock-up control according to the invention can be applied are the transition to 4–2 shifting during 6–4 shifting, the transition to 4–3 shifting during 5–4 shift and the transition to 4–2 shifting during 5–4 shifting.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

The disclosure of Japanese Patent Application No. 2001-335904 filed Oct. 31, 2001 including specification, drawings and claims is incorporated herein by reference in its entirety.

What is claimed is:

1. A lock-up control apparatus for an automatic transmission in which operations of four engagement elements are required when shifting is performed from a first shift speed to a second shift speed, the first shift speed being achieved by engagement of a first engagement element and a second engagement element, the second shift speed being achieved by engagement of a third engagement element and a fourth engagement element, the apparatus comprising:

a lock-up control unit that performs a control for bringing a lock-up clutch into one of a disengagement state and a slip state at a start of shifting, and that prevents reengagement of the lock-up clutch at a completion of engagement of the third engagement element when shifting is performed from the first shift speed to the second shift speed during lock up.

2. The lock-up control apparatus for an automatic transmission according to claim 1, wherein disengagement of the second engagement element is started after disengagement of the first engagement element is started, and engagement of the fourth engagement element is completed after engagement of the third engagement element is completed.

3. The lock-up control apparatus for an automatic transmission according to claim 2, wherein the lock-up control unit does not completely engage the lock-up clutch at the completion of engagement of the third engagement element.

4. The lock-up control apparatus according to claim 2, wherein the lock-up control unit maintains the lock-up clutch in one of the disengagement state and the slip state at the completion of engagement of the third engagement element.

5. The lock-up control apparatus for an automatic transmission according to claim 1, wherein the lock-up control unit does not completely engage the lock-up clutch at the completion of engagement of the third engagement element.

6. The lock-up control apparatus according to claim 1, wherein the lock-up control unit maintains the lock-up clutch in one of the disengagement state and the slip state at the completion of engagement of the third engagement element.

7. A lock-up control apparatus for an automatic transmission which inputs power via a lock-up clutch, and performs shifting by operations of a first through a fourth engagement elements when shifting is performed from the first shift speed to the second shift speed, and which continuously performs a shift control of a previous phase in which the first engagement element is disengaged and the third engagement element is engaged, and a shift control of a subsequent phase in which the second engagement element is disengaged and the fourth engagement element is engaged when shifting is performed from the first shift speed to the second shift speed, comprising:

a lock-up control unit that performs a control for preventing reengagement of a lock-up clutch at a completion of shifting of the previous phase, the lock-up clutch having been brought into one of a disengagement state and a slip state at a start of shifting when shifting is performed from the first shift speed to the second shift speed during lock up.

8. The lock-up control apparatus for an automatic transmission according to claim 7, wherein the lock-up clutch is composed of a single-plate clutch, and a control for preventing the reengagement of the lock-up clutch is a control that decreases or makes a differential pressure of an oil pressure applied to the lock-up clutch zero.

9. The lock-up control apparatus for an automatic transmission according to claim 7, wherein the lock-up clutch is composed of a multi-plate clutch, and the control for preventing the reengagement of the lock-up clutch is a control that decreases or makes a pressure supplied to the lock-up clutch zero.

10. The lock-up control apparatus for an automatic transmission according to claim 7, wherein a third shift speed is achieved by the shift control of the previous phase, and a control for preventing the reengagement of the lock-up clutch is achieved based on judgement on formation of a command for shifting to the second shift speed at a completion of the shifting to the third shift speed.

11. The lock-up control apparatus for an automatic transmission according to claim 10, wherein the third shift speed is a shift speed that achieves the gear ratio between the first shift speed and the second shift speed, and the shifting from the first shift speed to the second shift speed is jumping shifting.

12. The lock-up control apparatus for an automatic transmission according to claim 11, wherein the control for preventing the reengagement of the lock-up clutch is cancelled at a completion of the shifting to the second shift speed.

13. A lock-up control method for an automatic transmission in which operations of four engagement elements are required when shifting is performed from a first shift speed to a second shift speed, the first shift speed being achieved by engaging a first engagement element and a second engagement element, the second shift speed being achieved by engaging a third engagement element and a fourth engagement element, the method comprising:

performing a control to bring a lock-up clutch into one of a disengagement state and a slip state at a start of shifting, and to prevent reengagement of the lock-up clutch at a completion of engagement of the third engagement element when shifting is performed from the first shift speed to the second shift speed during lock up.

14. The lock-up control method according to claim 13, wherein disengagement of the second engagement element is started after disengagement of the first engagement element is started, and engagement of the fourth engagement element is completed after engagement of the third engagement element is completed.

15. The lock-up control method according to claim 14, wherein performing the control does not completely engage the lock-up clutch at the completion of engagement of the third engagement element.

16. The lock-up control method according to claim 14, wherein performing the control maintains the lock-up clutch in one of the disengagement state and the slip state at the completion of engagement of the third engagement element.

17. The lock-up control method according to claim 13, wherein performing the control does not completely engage the lock-up clutch at the completion of engagement of the third engagement element.

18. The lock-up control method according to claim 13, wherein performing the control maintains the lock-up clutch in one of the disengagement state and the slip state at the completion of engagement of the third engagement element.

19. A lock-up control method for an automatic transmission which inputs power via a lock-up clutch, and performs shifting by operations of a first through a fourth engagement elements when shifting is performed from the first shift speed to the second shift speed, and which continuously performs a shift control of a previous phase in which the first engagement element is disengaged and the third engagement element is engaged, and a shift control of a subsequent phase in which the second engagement element is disengaged and the fourth engagement element is engaged when shifting is performed from the first shift speed to the second shift speed, the method comprising:

performing a control to prevent reengagement of a lock-up clutch at a completion of shifting of the previous phase, the lock-up clutch having been brought into one of a disengagement state and a slip state at a start of shifting when shifting is performed from the first shift speed to the second shift speed during lock up.

20. The lock-up control method according to claim 19, wherein the lock-up clutch is composed of a single-plate clutch, and the control to prevent the reengagement of the lock-up clutch is a control that decreases or makes a differential pressure of an oil pressure applied to the lock-up clutch zero.

21. The lock-up control method according to claim 19, wherein the lock-up clutch is composed of a multi-plate clutch, and the control to prevent the reengagement of the lock-up clutch is a control that decreases or makes a pressure supplied to the lock-up clutch zero.

22. The lock-up control method according to claim 19, wherein a third shift speed is achieved by the shift control of the previous phase, and the control to prevent the reengagement of the lock-up clutch is achieved based on judgement on formation of a command to shift to the second shift speed at a completion of the shifting to the third shift speed.

23. The lock-up control method according to claim 22, wherein the third shift speed is a shift speed that achieves the gear ratio between the first shift speed and the second shift speed, and the shifting from the first shift speed to the second shift speed is jumping shifting.

24. The lock-up control method according to claim 23, wherein the control to prevent the reengagement of the lock-up clutch is cancelled at a completion of the shifting to the second shift speed.

* * * * *